UNITED STATES PATENT OFFICE.

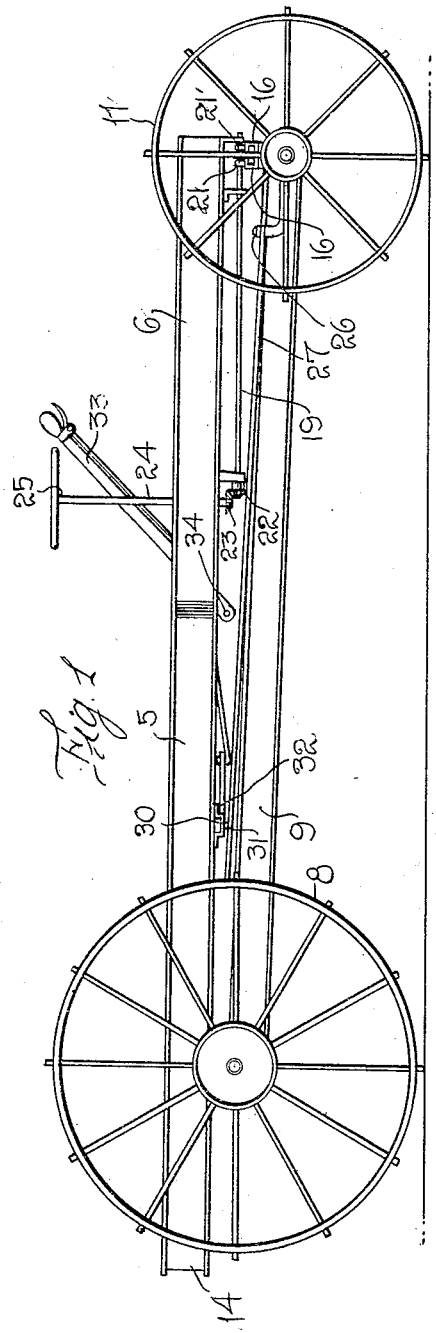

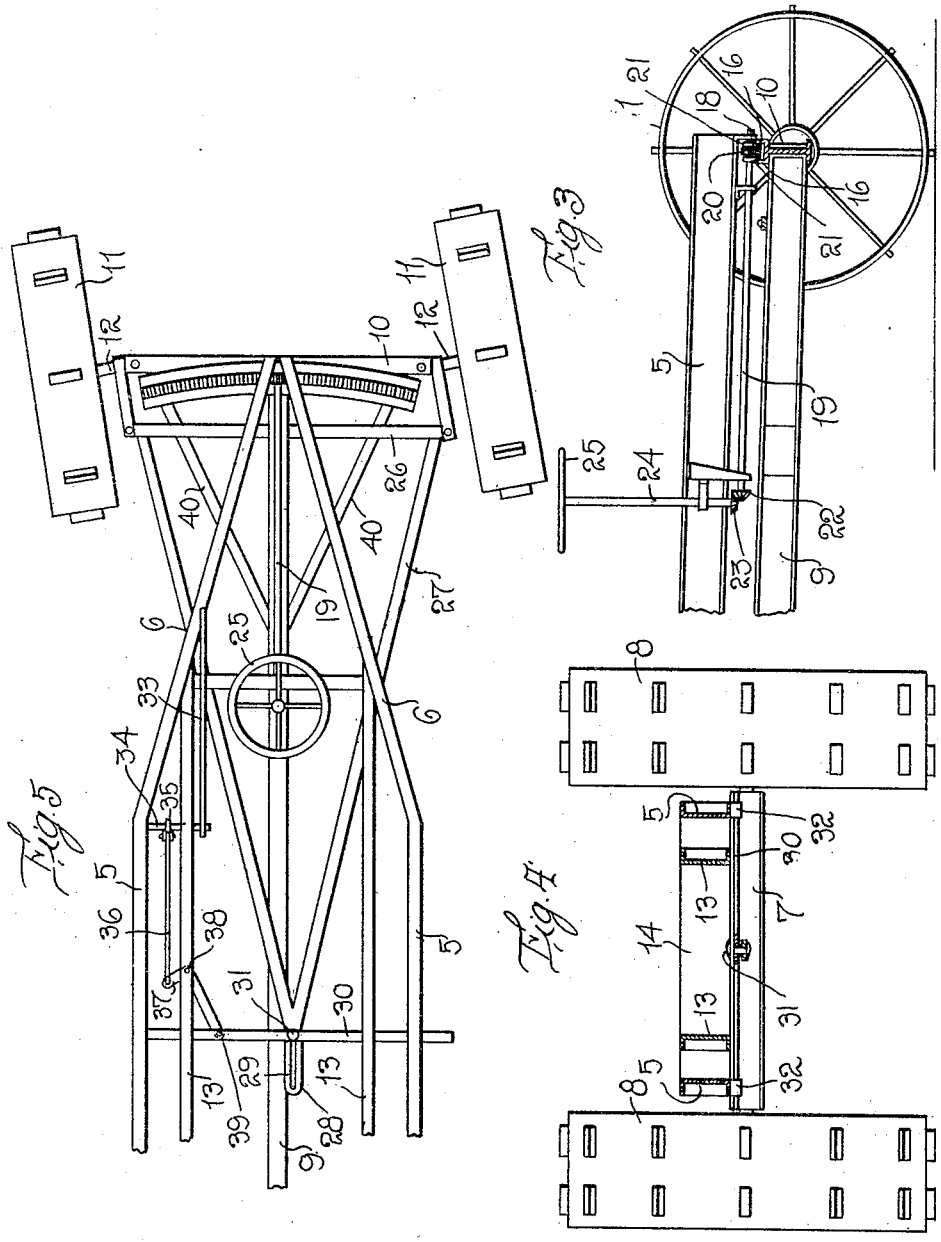

WILLIAM G. HOFELDT, OF GREAT FALLS, MONTANA.

TRACTOR.

1,246,920.  Specification of Letters Patent.  Patented Nov. 20, 1917.

Application filed April 18, 1917. Serial No. 162,994.

*To all whom it may concern:*

Be it known that I, WILLIAM G. HOFELDT, a citizen of the United States, residing at Great Falls, in the county of Cascade and State of Montana, have invented certain new and useful Improvements in Tractors, of which the following is a specification, reference being had to the accompanying drawings.

This invention relates to improvements in tractors and has for its primary object to provide improved steering means for such vehicles whereby the machine may be easily and quickly guided or turned.

It is a more particular object of the invention to provide improved means for turning the main frame of the machine and the front steering wheel, an operative connection to the rear wheels of the machine whereby the same are simultaneously turned with respect to the line of movement, and means for independently controlling the movement of the rear vehicle wheels.

It is another object of my invention to provide a steering mechanism for the above purpose, which is durable and reliable in practical use, will enable the machine to be turned on a relatively small part, and is also capable of manufacture at relatively small cost.

With the above and other objects in view, my invention consists in the novel features of construction, combination and arrangement of parts to be hereinafter more fully described, claimed and illustrated in the accompanying drawings, in which, Figure 1 is a side elevation of the wheel supported frame of a tractor provided with my improved steering mechanism;

Fig. 2 is a top plan view thereof;

Fig. 3 is a section taken on the line 3—3 of Fig. 2;

Fig. 4 is a section taken on the line 4—4 of Fig. 2; and

Fig. 5 is a fragmentary plan view illustrating the rear wheels of the tractor disposed at an angle with relation to the line of movement of the machine.

Referring in detail to the drawings, 5 designates the spaced, longitudinal channel bars of the main frame of the machine which, at their rear ends, are convergently inclined as shown at 6. The front wheel axle 7 is suitably mounted upon the under sides of these frame bars and the tractor wheels 8 are revolubly mounted on the ends of said axle. 9 designates the longitudinally extending draft bar which is connected at its forward end to the center of the axle 7 and at its rear end to the rear wheel axle 10. The ground wheels 11 are connected to the ends of the axle 10 by steering knuckles 12. Additional longitudinal beams 13 are arranged between the parallel beams 5 and fixed to the convergently disposed portions 6 thereof, said beams also supporting the front axle 7 and having a transverse channel beam 14 fixed to their forward ends, said beam also being secured to the frame beams 5. Inclined braces 15 connect the transverse beam 14 to the forward end of the draft beam 9.

Upon the rear axle 10, spaced channel bars 16 are secured, said channel bars being arcuately curved in concentric relation to the king bolt 17 which connects the forward end of the draft beam 9 to the front wheel axle 7. Between the channel bars 16, a rack 18 is secured. In suitable bearings carried by the main frame of the machine, a longitudinally disposed shaft 19 is rotatably mounted, said shaft having a cog gear 20 on one end to mesh with the rack 18 and being also provided with a bearing roller indicated at 21, which is movable upon the upper surface of one of the channel bars 16. Upon the other or forward end of the shaft 19, a bevel gear 22 is secured and engaged by a similar bevel gear 23 on the lower end of the steering shaft 24, upon the upper end of which a suitable hand wheel 25 is fixed.

The arms of the wheel knuckles 12 are connected by the transverse bar 26, and rearwardly extending, convergently disposed bars 27 are connected to the ends of the bar 26. The forward ends of the bars 27 are integrally connected to each other and provided with a longitudinally extending arm 28 which is slotted, as at 29, to receive a pin or bolt 31 centrally fixed in a transverse bar 30. This bar is shiftable through the supporting guides 32 which are secured on the under sides of the frame bars 5 and the bars 13.

Upon the machine frame, a lever 33 is mounted. This lever 33 is fixed at its lower end to a rock shaft 34 mounted in suitable bearings on the machine frame, said shaft being provided with an arm 35 which is connected by a rod 36 to one arm of the bell crank lever 37 fulcrumed, as at 38, upon one of the longitudinal bars 13. The other or longer arm of this lever is pivotally connected, as at 39, to the transversely movable bar 30.

The spaced channel bars 16 are braced from the central draft bar 9 by the inclined brace bars 40 which are fixed at their forward ends to opposite sides of the draft beam and at their rear ends to the opposite ends of the channel bars.

In the operation of the improved steering mechanism, when the hand gear 25 is turned in the proper direction, rotation is transmitted to the longitudinal shaft 19, and through the medium of the gear 20 meshing with the rack 18, the main frame of the machine is shifted in one direction or the other, thus turning the rear wheel axle and the wheels 8 with respect to the draft bar 9. In this movement of the main frame, the connecting bars 27 to the knuckles 12 of the rear wheels are also shifted through the transverse displacement of the bar 30 mounted upon the main frame, so that the rear wheels 11 are also turned or angularly positioned with respect to the line of draft. The wheels 11, however, are disposed in an opposite, angular direction with respect to the front wheels 8 of the machine. In this manner, the machine may be guided or directed in its travel so as to readily avoid obstructions or direct its course. The rear wheels 11 may also be turned or angularly positioned with respect to the machine frame independently of the front wheels 8, by the manipulation of the lever 33. When this lever is moved, the shaft 34 will be rocked and the rod 36 moved to shift the transverse bar 30 through the medium of the bell crank 37. As this bar has a slot and pin connection to the forward ends of the bars 27, it will be obvious that the steering knuckles 12 will be correspondingly turned to dispose the rear wheels 11 at the desired angle.

From the foregoing description, taken in connection with the accompanying drawings, the construction, manner of operation and several advantages of the invention will be clearly and fully understood. Any preferred type of operating engine and driving connection to the front vehicle wheels may be provided. As the present invention relates solely to the steering mechanism for the purpose of enabling the latter to be readily understood, I have omitted any illustration or reference to the driving mechanism or the plows or other accessories which may be used in connection with a tractor. It will be seen that by means of the invention, the tractor may be readily guided and also completely turned on a relatively small part. The construction of the frame above described, as well as the wheels and the mounting thereof, may be greatly modified, and the several coöperating elements of my improved steering mechanism are also susceptible of considerable variation in their form, proportion and arrangement. It is, therefore, to be understood that while I have herein disclosed the present preferred embodiment of the invention, the same is nevertheless susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. In a tractor, a main frame having a front wheel axle mounted thereon, a draft beam to which the axle is centrally connected for angular movement, a rear wheel axle fixed to the rear end of the beam, steering knuckles mounted on the opposite ends of said rear axle and each carrying a steering wheel, manually operable means for turning the frame and front axle with respect to the beam to angularly position the front wheels with relation to the line of draft, means operatively connecting the frame to the knuckles of the steering wheel to simultaneously position the latter wheels but at an opposite angle with respect to the front wheel, and additional manually operable means for independently actuating such connection to angularly position the steering wheel.

2. In a tractor, a frame, a front wheel carrying axle mounted on the frame, a central longitudinal draft beam to which the front axle is pivoted at its center for angular movement, a rear axle fixed to the rear end of said beam, an arcuate rack mounted on the rear axle, a shaft rotatably mounted upon the frame and having a cog gear meshing with said rack, a steering shaft geared to the first named shaft whereby the cog gear is rotated to swing the tractor frame horizontally and angularly position the forward wheels with respect to the line of draft, steering wheels operatively connected to the ends of the rear axle for angular movement, and means actuated in the swinging movement of the tractor frame for angularly positioning the latter wheels reversely with respect to the front wheels.

3. In a tractor, a main frame, a front wheel carrying axle mounted thereon, a draft bar to which said axle is pivotally connected at its center for angular movement, a rear axle fixed upon said draft bar, steering knuckles mounted on the ends of the latter axle and each carrying a wheel, manually operable means for swinging the main frame horizontally with respect to the draft beam to angularly position the front wheels relative to the line of draft, and additional manually operable means connected to the steering knuckles to position the rear wheels at an opposite angle with respect to the front wheels.

4. In a tractor, a main frame, a front wheel carrying axle mounted thereon, a draft bar to which said axle is pivotally connected at its center for angular movement, a rear axle fixed upon said draft bar, steering knuckles mounted on the ends of the latter axle and each carrying a wheel, manually operable means for swinging the main frame horizontally with respect to the draft beam to angularly position the front wheels relative to the line of draft, a transverse bar shiftable upon the main frame, an operative connection between said bar and the steering knuckles, and manually operable means connected to said bar to shift the same and simultaneously dispose the rear wheels in angular relation to the line of draft.

5. In a tractor, a main frame, a front wheel carrying axle mounted thereon, a draft bar to which said axle is pivotally connected at its center for angular movement, a rear axle fixed upon said draft bar, steering knuckles mounted on the ends of the latter axle and each carrying a wheel, manually operable means for swinging the main frame horizontally with respect to the draft beam to angularly position the front wheels relative to the line of draft, a transverse bar shiftable upon the main frame, an operative connection between said bar and the steering knuckles, a bell crank lever having one of its arms pivotally connected to said shiftable bar, and manually operable means connected to the other arm of the lever and operable to shift said bar in either direction and angularly position the rear wheels with respect to the line of draft independently of the front wheels.

In testimony whereof I hereunto affix my signature in the presence of two witnesses.

WILLIAM G. HOFELDT.

Witnesses:
EDYTH CALCART,
EDMUND P. BENNETT.

Copies of this patent may be obtained for five cents each, by addressing the "Commissioner of Patents, Washington, D. C."